US007710752B2

(12) United States Patent
West

(10) Patent No.: US 7,710,752 B2
(45) Date of Patent: May 4, 2010

(54) TRANSFORMERLESS UTILITY-GRID-INTERACTIVE INVERTER

(75) Inventor: Rick West, Pismo Beach, CA (US)

(73) Assignee: Xantrex Technology Inc., Livermore, CA (US)

( * ) Notice: Subject to any disclaimer, the term of this patent is extended or adjusted under 35 U.S.C. 154(b) by 266 days.

(21) Appl. No.: 11/308,896

(22) Filed: May 23, 2006

(65) Prior Publication Data

US 2007/0273338 A1 Nov. 29, 2007

(51) Int. Cl.
*H02M 7/493* (2007.01)
(52) U.S. Cl. .............................. 363/71; 363/49; 323/906
(58) Field of Classification Search .................. 363/71, 363/41, 49, 65, 43; 323/906; 307/45, 82
See application file for complete search history.

(56) References Cited

U.S. PATENT DOCUMENTS

| | | | | | |
|---|---|---|---|---|---|
| 5,450,309 | A | * | 9/1995 | Rohner | 363/71 |
| 6,259,017 | B1 | * | 7/2001 | Takehara et al. | 307/82 |
| 6,448,489 | B2 | * | 9/2002 | Kimura et al. | 136/244 |
| 6,914,418 | B2 | * | 7/2005 | Sung | 320/140 |
| 6,969,967 | B2 | * | 11/2005 | Su | 318/801 |
| 2004/0165408 | A1 | * | 8/2004 | West et al. | 363/131 |
| 2004/0223348 | A1 | * | 11/2004 | West | 363/39 |

FOREIGN PATENT DOCUMENTS

JP 06165513 A * 6/1994

* cited by examiner

*Primary Examiner*—Harry Behm
(74) *Attorney, Agent, or Firm*—Nixon Peabody LLP

(57) ABSTRACT

An electrical DC-to-AC power conversion apparatus is disclosed that is primarily intended for use with solar photovoltaic sources in electric utility grid-interactive applications. The invention improves the conversion efficiency and lowers the cost of DC-to-AC inverters. The enabling technology is a novel inverter circuit topology, where the bulk of the throughput power, from DC source to AC utility, is processed only once. The inverter does not require an isolation transformer and can be connected directly to a 480/277 Vac utility grid. The invention also allows the power converter to start into photovoltaic array having higher open circuit voltages. The invention also uses active ripple current cancellation to substantially reduce the cost, size and weight of the main filter inductors.

6 Claims, 5 Drawing Sheets

TRANSFORMERLESS UTILITY-GRID-INTERACTIVE INVERTER

BACKGROUND OF THE INVENTION

Photovoltaic (PV) cells produce power over a wide voltage range depending on the amount of sunlight and the temperature of the photovoltaic cell. There are National Electric Code and class-of-equipment restrictions that make PV arrays much more cost effective when sized for a maximum of 600 Vdc. In order to source AC power into the electric utility grid, over the expected range of DC voltages, prior art utility-interactive inverters use two power conversion stages.

In all prior art topologies discussed, 100% of the throughput power is processed twice and power is lost in each conversion stage. The invention is an improvement over the prior art because the bulk of the DC-to-AC conversion is done in one direct conversion and only 0% to 25% of the throughput power is processes twice for a worst-case equivalent of 1¼ conversion steps, instead of 2. This translates to at least 38% less complexity, cost and conversion losses over the prior art.

BRIEF DESCRIPTION OF THE PRIOR ART

FIG. 4 shows the most common prior art solution for a grid-interactive photovoltaic power converter for connection to a 480/277 Vac utility. This topology uses a monopolar photovoltaic array, a 3-phase bridge and 60 Hz step-up transformer. Monopolar photovoltaic array 10 is connected to terminals 21 and 22 across capacitor 40 at the input of bridge 60. The AC output of bridge 60 is connected to the low voltage windings of transformer 30. The low voltage side of transformer 30 approximately 173 Vac line-to-line to insure photovoltaic array 10 voltage will be high enough on the hottest days to source undistorted sinewaves of current into utility grid 90. There are two major drawbacks to this approach. First, the currents in bridge 60 are much higher because the available DC bus voltage for bridge 60 is half that of an inverter using a bipolar array. As such, the current into the low voltage windings of transformer 30 are double for an equivalent power rating. Higher current means higher losses and higher component costs. Second, the cost, weight and losses associated with transformer 30 are significant. The transformer must also be disconnected at night to save excitation losses. The automatic circuitry required to provide this nighttime transformer function increases cost and complexity.

FIG. 5 shows a less common prior art solution for a grid-interactive photovoltaic power converter for connection to a 480/277 Vac utility. This topology uses a bipolar array configuration and two non-isolated boost circuits. Bipolar photovoltaic array 10 is comprises subarrays 11 and 12 connected at power converter input terminals 21, 20 and 22. Inductor 31, rectifier 33 and semiconductor switch 35 boost the voltage from positive array monopole 11 to a voltage across capacitor 41 that is higher than the positive peaks of the utility voltage at utility interface 90. Inductor 32, semiconductor switch 35 and rectifier 34 boost the voltage from negative array monopole 12 to a voltage across capacitor 42 that is more negative than the negative peaks of the utility voltage at utility interface 90. Bridge 60 provides the current-regulated DC to three-phase AC conversion. The interface to utility grid 90 is at power converter output terminals 81, 82, 83 and 80 a direct, transformerless connection to the utility grid. The drawback with this topology is that all of the throughput power must be processed twice, once by the DC-to-DC boost circuits and once by bridge 60. This double conversion limits the power conversion efficiency of the system.

DETAILED DESCRIPTION OF THE INVENTION

Figure 1:
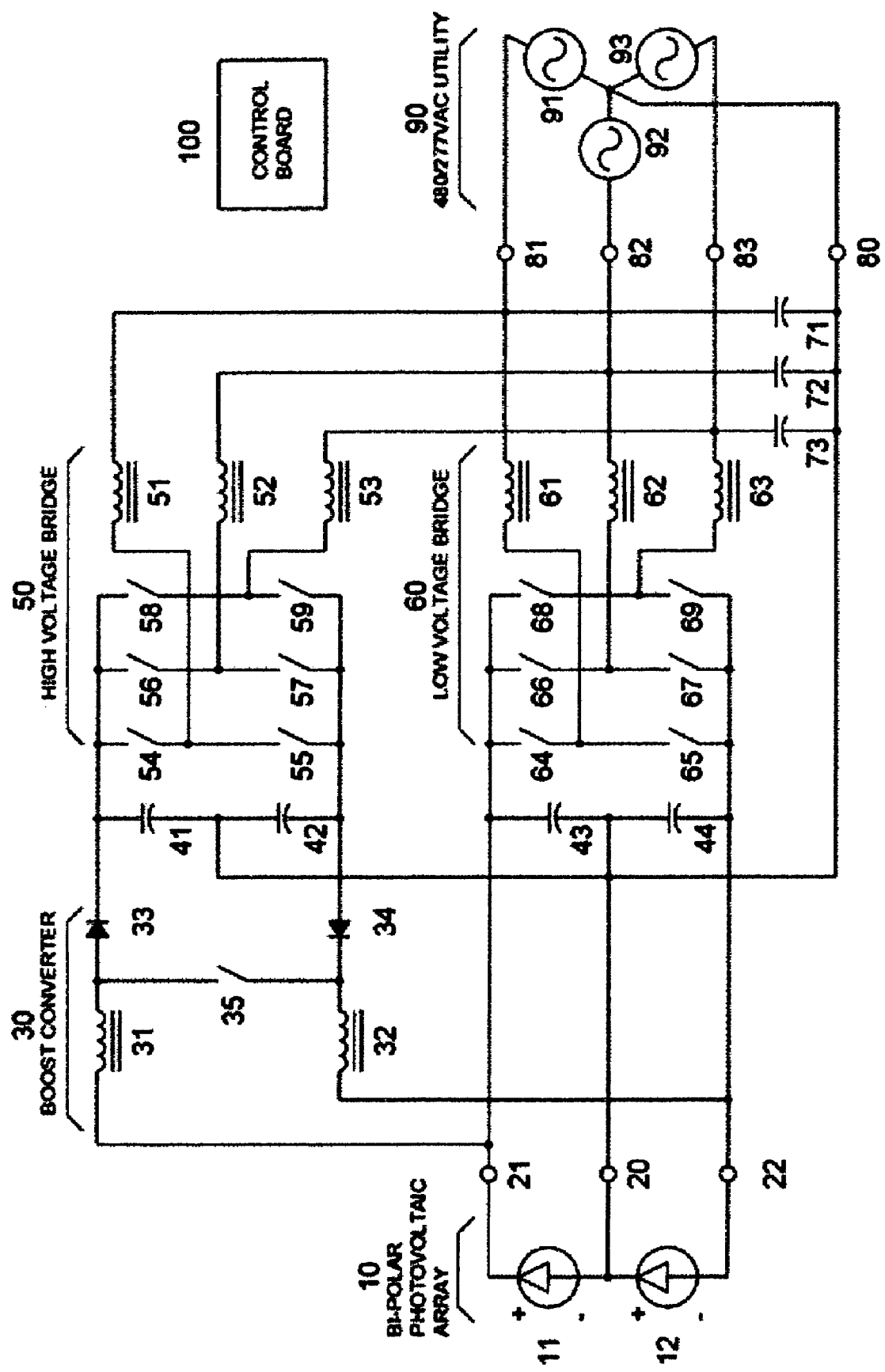
FIG. 1 shows an electrical diagram of the preferred embodiment of the invention.

FIG. 1 illustrates the preferred embodiment of the invention. Photovoltaic arrays 11 and 12 are connected in a bipolar configuration at the input of the power converter. Terminal 21 is positive with respect to ground, terminal 22 is negative with respect to ground and terminal 20 is reference to ground. Capacitors 43 and 44 are electrically connected across photovoltaic arrays 11 and 12 to form a low impedance DC bus for semiconductor switching elements 64-69. Semiconductor switching elements 64-69 are typically insulated gate bipolar transistors (IGBTs) arranged in a conventional three phase bridge arrangement with filter inductors 61-63. Switching elements 64 and 65 are switched on and off to create a pulse-width-modulated (PWM) high frequency pulse train. The pulse train is filtered by inductor 61. The current through inductor 61 is regulated by a servo loop, resident on control board 100, where the actual current through inductor 61 is compared to a desired sinusoidal current reference. The difference between the actual and reference value is used to create the high frequency pulse train. The sinusoidal current through inductor 61 is regulated to be in phase with the sinusoidal utility grid voltage 91 at terminal 81. The same closed loop current regulation method is used for the remaining two phases of bridge 60 as well as the three phases of bridge 50. The topology shown for bridges 50, 60 is known as is the closed loop current regulation methodology used on all phases of both bridges. The current references for either bridge may or may not be pure sinusoids.

Figure 2:
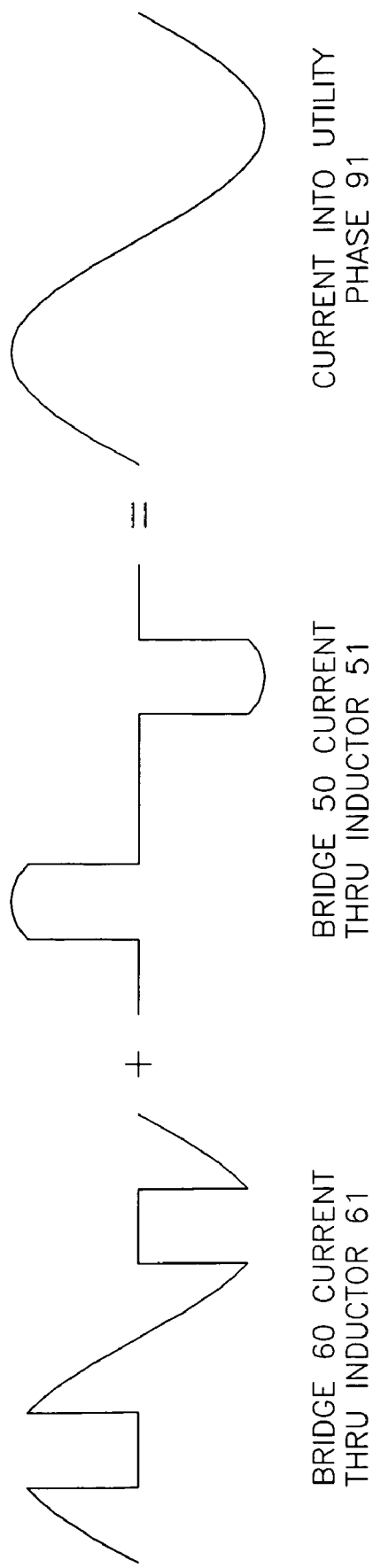
FIG. 2 shows how currents from two bridges are summed together at one phase of a utility grid connection.

Each output phase of bridge 60 is summed with an output phase of bridge 50. For this discussion, three phase utility grid 90 can be considered as three, zero-impedance voltage sources 91, 92 and 93 with a common, grounded neutral at terminal 80. As such, the currents through inductors 61 and 51 will algebraically add and the resultant, composite current waveform will be sourced into the utility grid 90 at terminal 81. The same will hold true for the remaining two phases. Capacitors 71, 72 and 73 are used to provide a second filter pole at high frequencies where the impedance of a non-ideal utility grid is non-zero. FIG. 2 illustrates the summation of bridge 50 and bridge 60 currents for one of the three phases.

Power can only be delivered into utility grid 90 from bridge 60 if the voltage across photovoltaic array 10 is higher than the instantaneous utility grid voltage for a given phase 91, 92 or 93. On hot days, photovoltaic array 10 will not have a maximum power point voltage high enough to enable bridge 60 to create the plus and minus current peaks into the utility grid. Under these conditions, the current sinewave will distorted or "flat-topped". This is when bridge 50 is brought into play to provide the missing peaks. Boost circuit 30 is a non-isolated boost circuit. When power semiconductor switch 35 is closed, inductors 31 and 32 are charged. When switch 35 is opened, the energy stored in inductors 31 and 32 is transferred to capacitors 41 and 42. Switch 35 is operated at high frequencies as part of a closed loop voltage regulation circuit, resident on control board 100. The DC voltage at the input of bridge 50 across capacitors 41 and 42 is regulated to a voltage just high enough to allow power to be sourced into utility grid 90 by bridge 50 during the peak excursions of the utility voltages 91, 92 and 93.

In renewable energy applications, it is crucial to convert power from a renewable energy source, such as a photovoltaic array, at very high conversion efficiencies. Also, the National Electric Code prohibits a photovoltaic array with high enough voltage to source undistorted power directly into a 480/277 Vac utility grid without the use of a lossey, 60 Hz transformer or autotransformer. The invention enables a direct, code-compliant 480/277 Vac grid connection with high power conversion efficiencies. The high efficiency is achieved by processing the bulk of the throughput power once with low voltage bridge 60 and a much smaller amount of power with boost circuit 30 and high voltage bridge 50.

One additional advantage afforded by this novel power converter topology is that a significant high frequency ripple current cancellation can be had even when high voltage bridge 50 is regulating zero current per phase. High frequency pulse modulation is used to create the sinusoidal currents for each phase in both high voltage bridge 50 and low voltage bridge 60. In the invention, high frequency pulse modulation for low voltage bridge 60 is out of phase with that of high voltage bridge 50 to provide substantial high frequency ripple current cancellation at the current summation points of the two bridges. Because of the ripple current cancellation, the size and cost of filter inductors 51-53 and 61-63 can be reduced significantly.

Also, because high voltage bridge 50 works at higher voltages, switches 54-59 must be rated for higher voltages than switches 64-69. The higher voltage switches 54-59 are less efficient and more costly and would not be well suited for use in bridge 60 where high conversion efficiency is critical. The expense of higher voltage switches 54-59 is leveraged in this invention by using bridge 50 to pull down the open circuit photovoltaic array voltage to the maximum power point voltage when the power converter is started up with an energized photovoltaic array. The open circuit voltage is typically pulled down in less than a second to a safe level where bridge 60 switches begin to operate and supplant bridge 50 currents.

Figure 3:
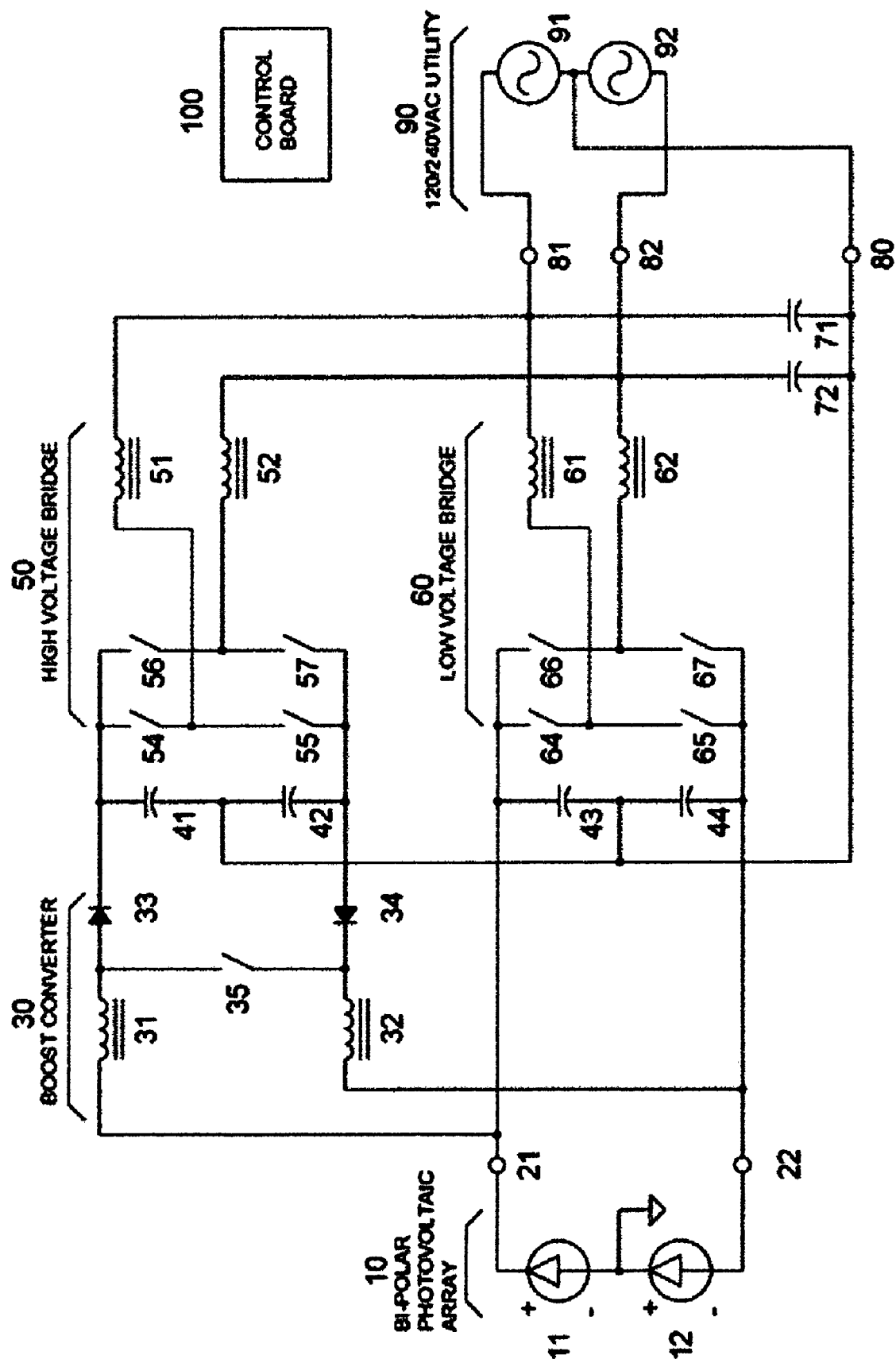
FIG. 3 shows a single-phase variant of the preferred embodiment of the invention.
Figure 4:
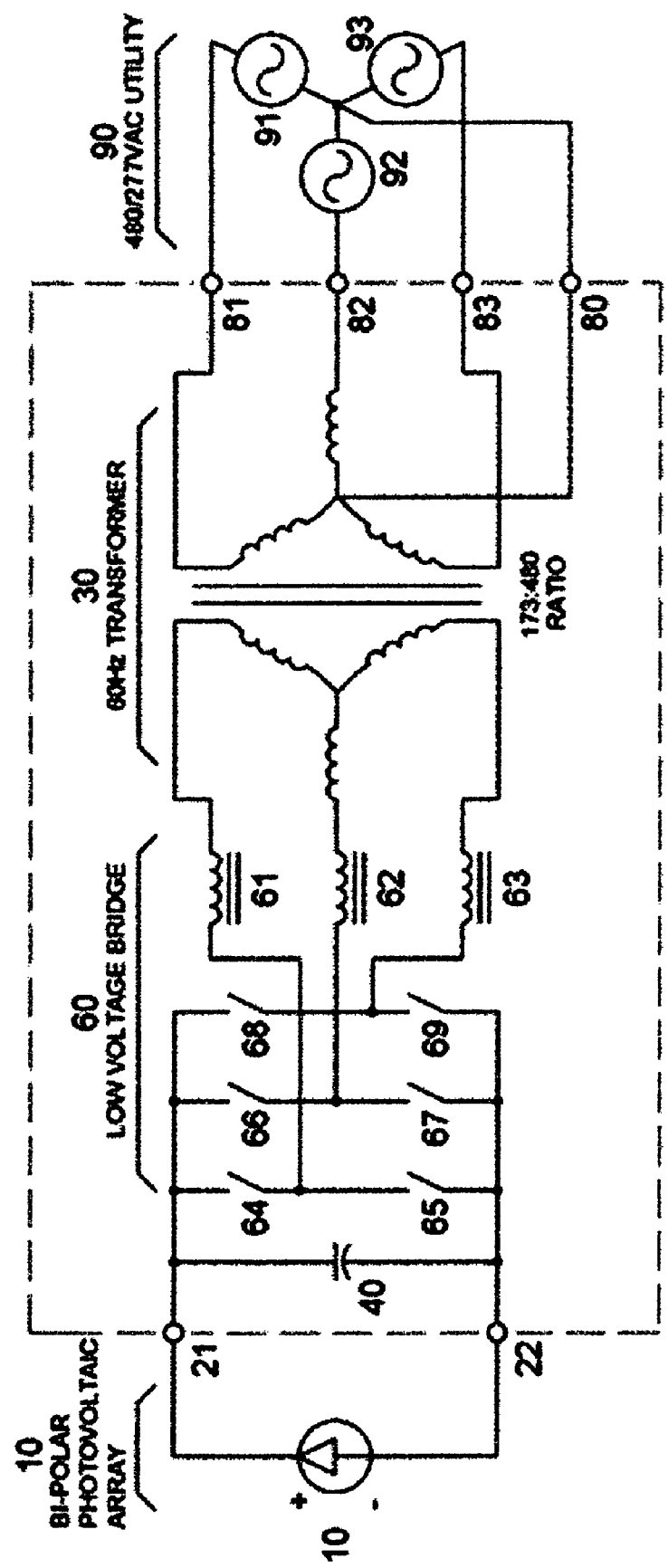
FIG. 4 illustrates a common, prior art, transformer isolated, 3-phase power converter.
Figure 5:
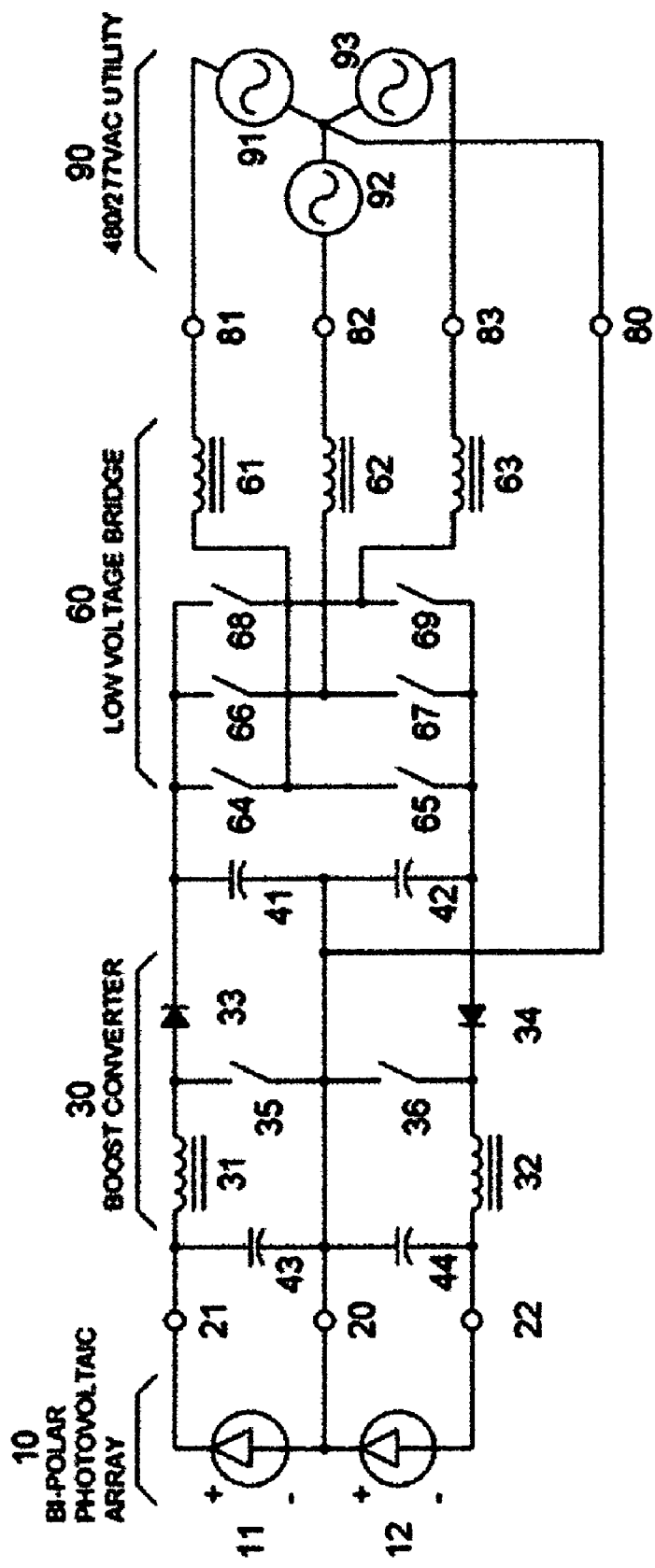
FIG. 5 illustrates a less common, prior art, transformerless, 3-phase power converter.

FIG. 3 shows a variation of the preferred embodiment illustrated in FIG. 1 for connection to a single-phase 240 Vac or 120/240 Vac split phase utility grid. All functions features, reference designators and descriptions are analogous to the three phase power converter disclosed in FIG. 1.

What is claimed is:

1. A utility-grid-interactive electrical power converter apparatus for converting power from a DC source or DC sources into AC power, by regulating current or currents into a given phase or phases of an electric power grid to source power into said electric power grid, comprising:
    a lower voltage DC-to-AC converter comprising a plurality of output phases,
    a DC-to-DC boost converter comprising an arrangement of devices configured to enable the DC-to-DC boost converter to convert the DC voltage from the DC source to a higher DC voltage,
    input terminals coupled to the lower voltage DC-to-AC converter and the DC-to-DC boost converter for receiving the DC voltage from the DC source and applying the DC voltage to the lower voltage DC-to-AC converter and the DC-to-DC boost converter,
    a higher voltage DC-to-AC converter comprising a plurality of output phases different from the output phases of the lower voltage DC-to-AC converter, each output phase of the higher voltage DC-to-AC converter being connected to a unique output phase of the lower voltage DC-to-AC converter, the higher voltage DC-to-AC converter being coupled to the DC-to-DC boost converter to receive as an input voltage the higher DC voltage, and
    a control circuit,
    wherein each of the lower voltage DC-to-AC converter and the higher voltage DC-to-AC converter has an arrangement of devices configured to enable each DC-to-AC converter to regulate current into a given utility grid phase according to commands provided by the control circuit.

2. A power converter apparatus according to claim 1 wherein the controller is configured to control the power converter apparatus such that,
    a) when there is sufficient voltage from the DC source, the lower voltage DC-to-AC converter converts power from the DC source into power supplied to the electric power grid with no contribution from the higher voltage DC-to-AC converter, and such that,
    b) when there is not sufficient voltage from the DC source to enable the lower voltage DC-to-AC converter to produce a desired current, the higher voltage DC-to-AC converter supplements current from the lower voltage DC-to-AC converter, thereby providing the desired current into the electric power grid.

3. A power converter apparatus according to claim 1 wherein the controller is configured to use high frequency pulse modulation to create sinusoidal currents for each electric power grid phase in both the higher voltage and lower voltage DC-to-AC converters, a high frequency pulse modulation for the lower voltage DC-to-AC converter being controlled to be out of phase with a high frequency pulse modulation of the higher voltage DC-to-AC converter at the pulse modulation switching frequency, whereby a level of high frequency ripple current cancellation is provided at current summation points of the lower voltage DC-to-AC converter and higher voltage DC-to-AC converter.

4. A power converter apparatus according to claim 1 wherein the controller is configured to control the lower voltage DC-to-AC converter and the higher voltage DC-to-AC converter to supply power to a single phase, split-phase or poly-phase electric power grid.

5. A power converter apparatus according to claim 1 wherein the controller is configured to control the power converter apparatus such that,
    a) when there is sufficient voltage from the DC source, the lower voltage DC-to-AC converter converts power from the DC source into regulated sinusoidal currents with no contribution from the higher voltage DC-to-AC converter, and such that,
    b) when there is not sufficient voltage from the DC source to enable the lower voltage DC-to-AC converter to produce undistorted sinusoidal currents, the higher voltage DC-to-AC converter supplements current from the lower voltage DC-to-AC converter provides current over some period of time, thereby providing undistorted sinusoidal current into a given phase of the electric power grid.

6. A power converter apparatus that converts power from a photovoltaic source into electric utility grid power, comprising:
    two or more parallel DC-to-AC power processors, at least one of the parallel DC-to-AC power processors being configured for higher voltage operation, and a controller coupled to the parallel DC-to-AC power processors, wherein the controller is configured to control said at least one of the parallel DC-to-AC power processors to initially load and pull down an open circuit voltage of the photovoltaic source when the power converter apparatus is first started before other ones of the parallel DC-to-AC processors are enabled to allow the other ones of the parallel DC-to-AC power processors to operate at a voltage lower than the open circuit voltage of the photovoltaic source.

* * * * *